United States Patent [19]

Obara

[11] Patent Number: 4,710,603
[45] Date of Patent: Dec. 1, 1987

[54] ELECTRIC DISCHARGE MACHINING POWER SOURCE

[75] Inventor: Haruki Obara, Sagamihara, Japan
[73] Assignee: Fanuc Ltd., Minamitsuru, Japan
[21] Appl. No.: 801,157
[22] PCT Filed: Feb. 14, 1985
[86] PCT No.: PCT/JP85/00060
§ 371 Date: Oct. 28, 1985
§ 102(e) Date: Oct. 28, 1985
[87] PCT Pub. No.: WO85/03894
PCT Pub. Date: Sep. 12, 1985

[30] Foreign Application Priority Data

Feb. 29, 1984 [JP] Japan .................. 59-35984

[51] Int. Cl.$^4$ .................. B23H 1/02; G05F 1/44
[52] U.S. Cl. .................. 219/69 C; 219/69 P; 323/287
[58] Field of Search .......... 219/69 P, 69 C; 323/287, 266, 282

[56] References Cited

U.S. PATENT DOCUMENTS 3,959,714  5/1976  Mihelich .................. 323/282
3,305,767  2/1967  Biehl et al. .............. 323/282
4,382,168  5/1983  Inoue ..................... 219/69 C
4,580,090  4/1986  Bailey et al. ............ 323/282
4,592,763  6/1986  Dietz et al. ............. 323/282

FOREIGN PATENT DOCUMENTS 53-85596   7/1978  Japan ................. 219/69 P
55-5230    1/1980  Japan ................. 219/69 P
56-52691  12/1981  Japan .
184629    11/1982  Japan ................. 219/69 C Primary Examiner—Philip H. Leung
Assistant Examiner—Geoffrey S. Evans
Attorney, Agent, or Firm—Staas & Halsey

[57] ABSTRACT

An electric discharge machining power source for a capacitor discharge circuit for use in an electric discharge machine having charging and discharging switching elements (Q1, Q2). A charging current limiting resistor is omitted to decrease energy loss and to prevent the charging switching element (Q1) from being damaged by a surge voltage. A diode (D) is arranged in parallel with a charging/discharging capacitor (C1). The diode (D), the charging switching element (Q1) and a power source smoothing capacitor (C2) are arranged on a printed circuit board to decrease the stray inductances and hence prevent generation of the surge voltage.

8 Claims, 3 Drawing Figures

ELECTRIC DISCHARGE MACHINING POWER SOURCE

BACKGROUND OF THE INVENTION

The present invention relates to a power source for an electric discharge machine such as a die sinking type electric discharge machine or a wire type electric discharge machine for machining a metal or the like by using discharge energy from a capacitor.

A conventional power source circuit for an electric discharge machining power source for performing machining by discharge of the capacitor, is illustrated in FIG. 1. Referring to FIG. 1, reference symbol E denotes a power source; R1, a current limiting resistor; C1, a charging/discharging capacitor; P, an electrode; W, a workpiece; Q1, a transistor as a switching element for charging the capacitor C1; G1, a base of the transistor Q1; Q2, a transistor as a switching element for discharging the capacitor C1; and G2, a base of the transistor Q2. Reference symbols L1 and L2 respectively denote stray inductances present in the power source circuit. In the circuit having the arrangement described above, a pulse is supplied to the base G1 of the transistor Q1 which is then turned on, so that the capacitor C1 is charged. Then, the transistor Q2 is turned on after the transistor Q1 is turned off, and a voltage charged by the capacitor C1 is applied between the electrode P and the workpiece W. A discharge current from the capacitor C1 flows as a discharge spark between the electrode P and the workpiece W, thereby performing electric discharge machining. When a resistance of the current limiting resistor R1 is decreased to charge the capacitor C1 at a high speed, the resistor R1 generates heat, result in large energy loss. Further, when the transistor Q1 is turned off, energy stored by the stray inductance L1 in the power source circuit is applied as a large surge voltage in an emitter-collector path of the transistor Q1 to damage the transistor Q1, resulting in inconvenience. As a result, the current cannot be increased and high-speed charging of the capacitor C1 cannot be performed.

SUMMARY OF THE INVENTION

It is a first object of the present invention to eliminate the conventional drawback and to provide an electric discharge machining power source which can charge a capacitor discharge circuit at a high speed, which eliminates heat dissipation and which provides high power source efficiency.

It is a second object of the present invention to prevent a charging switching element from a capacitor in the capacitor discharge circuit from being damaged by a surge voltage.

It is a third object of the present invention to decrease a stray inductance present in a power source circuit and to minimize energy loss.

It is a fourth object of the present invention to provide an electric discharge machining power source for easily controlling a charging voltage of the capacitor in the capacitor discharge circuit.

In order to achieve the above objects of the present invention, there is provided an electric discharge machining power source for a capacitor discharge circuit with a charging switching element and a discharging switching element, wherein a charging current limiting resistor is omitted to eliminate energy loss caused by the resistor; a diode is connected in parallel with a charging/discharging capacitor, and the diode, the charging switching element and a power source smoothing capacitor are arranged on a printed circuit board to minimize a stray inductance, so that a surge voltage applied to the charging element is decreased to prevent the charging switching element from being damaged, even when the charging switching element through which a large current flows is turned off, thereby achieving high-speed charging.

Energy stored between a circuit portion consisting of the printed circuit board and the charging/discharging capacitor is accumulated in the charging/discharging capacitor through the diode, thereby decreasing energy loss. As described above, since no current limiting resistor is present, energy loss caused by heat dissipation of the resistor can be prevented. In addition, the surge voltage applied to the switching element is small. As a result, the wasteful power consumption of the switching element can be decreased, and an electric discharge machining power source having high power source efficiency can be obtained.

Since the current limiting resistor is omitted, the charging current linearly charges when the charging switching element is turned on. Therefore, by controlling the ON time of the charging transistor, the charging voltage at the capacitor can be easily controlled to a required level.

DETAILED DESCRIPTION OF THE PREFERRED EMBODIMENT

The present invention will be described in detail with reference to FIGS. 2 and 3.

Figure 2:
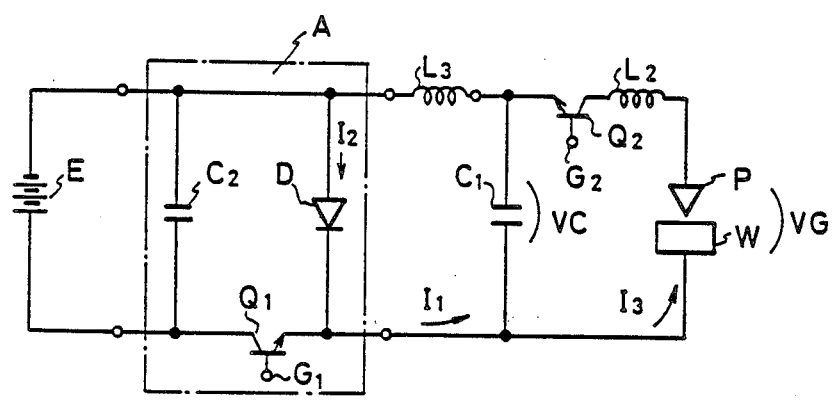
FIG. 2 is a circuit diagram of an electric discharge machining power source according to an embodiment of the present invention.

FIG. 2 shows an electric discharge machining power source according to an embodiment of the present invention. Reference symbol E denotes a power source; Q1 and Q1, charging and discharging transistors as switching elements, respectively; G1 and G2, bases of the transistors Q1 and Q2, respectively; C1, a charging/discharging capacitor; C2, a smoothing capacitor for the power source E; D, a diode; P, an electrode; W, a workpiece; and L2 and L3, stray inductances.

Figure 1:
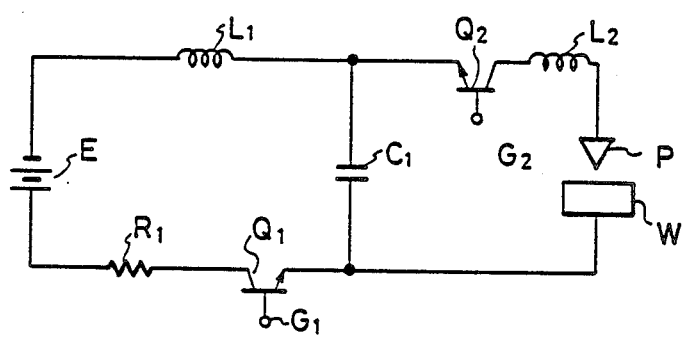
FIG. 1 is a circuit diagram of a conventional electric discharge machining power source.

According to the present invention, the capacitor C2, the charging transistor Q1 and the diode D are arranged on a printed circuit board A, but a current limiting resistor (the resistor R1 in FIG. 1) used in the conventional circuit is omitted from the printed circuit board. As a result, the stray inductances of the printed circuit board portion can be minimized. The inductance L2 is the one caused by lead wires connected to the electrode P and the workpiece W, and the like. The inductance L3 is the one caused by a connecting portion connected to the printed circuit board A and the charging/discharging capacitor C1. The charging/discharging capacitor C1 and the discharging transistor Q2 may be arranged on a printed circuit board as in a conventional case.

The operation of the electric discharge machining power source in this embodiment will be described with reference to a timing charge of FIG. 3.

Figure 3:
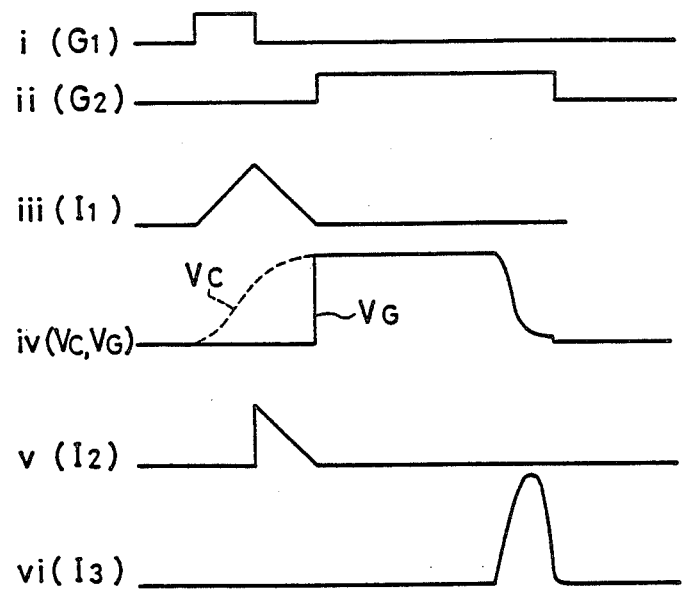
FIG. 3 is a timing chart of signals in the power source of FIG. 2.

Referring to FIG. 3, chart i shows a pulse applied to the base G1 of the transistor Q1; ii, a pulse applied to the base G2 of the discharging transistor Q2; iii, a charging current I1 flowing in the capacitor C1; iv, a charging voltage VC at the capacitor C1 and a gap voltage VG between the workpiece W and the electrode P; v, a current I2 flowing through the diode D; and vi, a discharging current I3 flowing between the workpiece W and the electrode. When a pulse in FIG. 3i is applied to the base G1 of the charging transistor Q1 which is then turned on, the current I1 flows in a cycle of the power source E, the transistor Q1, the capacitor C1, the inductance L3 and the power source E, so that the capacitor C1 begins to be charged. In this case, the current I1 increases linearly, as indicated in FIG. 3iii in accordance with the impedance of the stray inductance L3 as follows:

$$dI1/dt = (V - VC)/L3$$

where V is the voltage at the power source E. The charging voltage VC at the capacitor C1 is gradually increased, as indicated in FIG. 3iv. When the base G1 of the charging transistor Q1 is at its low level to turn off the transistor Q1, the current I2 flows by virtue of energy stored by the stray inductance L3, as indicated in FIG. 3v, through the diode D, thereby constituting a flywheel circuit and hence further charging the capacitor C1. In this case, the charging current I1 and the charging voltage VC of the capacitor C1 are determined by the stray inductance L3 and a pulse width (FIG. 3i) of the pulse applied to the base G1 to turn on the transistor Q1, as is apparent from the above description. By controlling the pulse width of the pulse for turning on the transistor Q1, or by adding a proper inductance when the stray inductance L3 is small, the charging voltage at the capacitor C1 can be controlled.

In this manner, the capacitor C1 is charged, and the pulse of FIG. 3ii is applied to the base G2 of the transistor Q2, thereby turning on the transistor Q2. As a result, the charging voltage VC of the capacitor C1 is applied in a gap between the workpiece W and the electrode P (VG in FIG. 3iv), and the electric discharge is started. As shown in FIG. 3vi, the discharge current I3 starts flowing between the workpiece W and the electrode P.

The electric discharge machining power source of the present invention operates as described above. Even if the large current I1 flows to charge the charging/discharging capacitor C1 at a high speed, and the charging transistor Q1 is turned off, since the stray inductances are very small due to the printed circuit board arrangement, the surge voltage applied to the charging transistor Q1 is therefore minimized to prevent the transistor Q1 from being damaged. The energy stored by the stray inductance L3 or the like between the printed circuit board and the charging/discharging capacitor C1 flows as the current i2 through the diode D, thereby further charging the capacitor C1 and hence decreasing energy loss.

What is claimed is:

1. An electric discharge machining power source for a capacitor discharge circuit of an electric discharge machine, having an electrode, for machining a workpiece, said electric discharge machining power source having a stray inductance therein, and supplying machining pulses across a machining gap between the electrode and the workpiece, comprising:

a charging switching element arranged to be turned on and off, said charging switching element being turned on for a period of time which is adjustable beforehand;

a discharging switching element arranged to be turned on and off, said charging and discharging switching elements being turned on alternately;

a charging/discharging capacitor coupled to said charging switching element and said discharging switching element, said charging/discharging capacitor being coupled through said discharging switching element to said machining gap and in series therewith, said charging/discharging capacitor being charged to a predetermined level during the period of time for which said charging switching element is turned on;

a diode coupled to said charging/discharging capacitor and said charging switching element at a node, the stray inductance having energy stored therein which causes an electric current to flow through said diode when said charging switching element is turned off, so that said charging/discharging capacitor is charged; and a power source smoothing capacitor coupled to said diode and said charging switching element, said diode, said charging switching element and said power source smoothing capacitor being arranged on a printed circuit board, without a charging current limiting resistor, so that the stray inductance has a value which is sufficient to prevent said charging switching element from being damaged even when the energy stored in the stray inductance is applied to said charging switching element, and to enable high-speed charging of said charging/discharging capacitor 2. An electric discharge machining power source according to claim 1, further comprising an inductance inserted between said printed circuit board and said charging/discharging capacitor, wherein said inductance has a value such that said inductance and the stray inductance cause said charging/discharging capacitor to be charged to the predetermined level.

3. An electric discharge machining power source according to claim 2, wherein said charging switching element comprises a charging transistor and wherein said discharging switching element comprises a discharging transistor.

4. An electric discharge machining power source according to claim 1, wherein said charging switching element comprises a charging transistor and wherein said discharging switching element comprises a discharging transistor.

5. An electric discharge machining power source for an electric discharge machine having an electric discharge across a machining gap between an electrode and a workpiece, said electric discharge machining power source having a stray inductance therein and comprising:

a printed circuit board circuit arranged on a printed circuit board and connectable to a power source, said printed circuit board circuit including:

a power source smoothing capacitor connectable across the power source;

a charging switching element connected to said power source smoothing capacitor and arranged to be turned on and off, said charging switching element being turned on for a predetermined period of time; and a diode connected to said power source smoothing capacitor at a first node and connected to said charging switching element and the workpiece at a second node, the stray inductance having energy stored therein which causes an electric current to flow through said diode when said charging switching element is turned off, the stray inductance having a value which is sufficient to prevent charging switching element from being damaged even when the energy stored in the stray inductance is applied to said charging switching element;

a charging/discharging capacitor connected to said printed circuit board circuit at the first and second nodes, and connected to the workpiece at the second node, said charging/discharging capacitor being charged to a predetermined level during the period of time for which said charging switching element is turned on, said charging/discharging capacitor also being charged when the energy stored in the stray inductance causes the electric current to flow through said diode, the stray inductance having a value which enables high speed charging of said charging/discharging capacitor;

a discharging switching element connected to the electrode and connected to said charging/discharging capacitor at the first node, said discharging switching element arranged to be turned on and off, said charging and discharging elements being turned on alternately, said charging/discharging capacitor being coupled through said discharging switching element to the machining gap and in series therewith.

6. An electric discharge machining power source according to claim 5, wherein said charging switching element comprises a charging transistor and wherein said discharging switching element comprises a discharging transistor.

7. An electric discharge machining power source according to claim 6, further comprising an inductance connected between the second node at said printed circuit board circuit and said charging/discharging capacitor, wherein said inductance has a value such that said inductance and the stray inductance cause said charging/discharging capacitor to be charged to a predetermined level.

8. An electric discharge machining power source according to clam 5, further comprising an inductance connected between the second node at said printed circuit board circuit and said charging/discharging capacitor, wherein said inductance has a value such that said inductance and the stray inductance cause said charging/discharging capacitor to be charged to a predetermined level.

* * * * *

UNITED STATES PATENT AND TRADEMARK OFFICE
CERTIFICATE OF CORRECTION

PATENT NO. : 4,710,603
DATED : DECEMBER 1, 1987
INVENTOR(S) : HARUKI OBARA

It is certified that error appears in the above-identified patent and that said Letters Patent is hereby corrected as shown below:

```
Col. 1, line 34, "result" should be --resulting--;
        line 52, "from" should be --for--.
```

Signed and Sealed this

Third Day of May, 1988

Attest:

DONALD J. QUIGG

*Attesting Officer*   *Commissioner of Patents and Trademarks*